United States Patent [19]

Boe

[11] 4,129,677

[45] Dec. 12, 1978

[54] MELT SPUN SIDE-BY-SIDE BICONSTITUENT CONDUCTIVE FIBER

[75] Inventor: Norman W. Boe, Gulf Breeze, Fla.

[73] Assignee: Monsanto Company, St. Louis, Mo.

[21] Appl. No.: 802,141

[22] Filed: May 31, 1977

[51] Int. Cl.² .............................................. D02G 3/00
[52] U.S. Cl. .................................. 428/372; 428/374; 428/397
[58] Field of Search ............... 428/372, 373, 374, 397, 428/367, 362, 370, 364, 394, 395; 264/171

[56] References Cited

U.S. PATENT DOCUMENTS

| | | | |
|---|---|---|---|
| 3,458,390 | 7/1969 | Ando et al. ........................... 428/373 |
| 3,582,448 | 6/1971 | Okuhashi et al. ................. 428/922 X |
| 3,718,534 | 2/1973 | Okamoto et al. ................. 428/397 X |
| 3,803,453 | 4/1974 | Hull ..................... 317/2 R |
| 3,823,035 | 7/1974 | Sanders .................... 117/226 |
| 3,969,559 | 7/1976 | Boe .................... 428/372 X |
| 4,045,949 | 9/1977 | Paton et al. ....................... 428/374 X |

*Primary Examiner*—Lorraine T. Kendell
*Attorney, Agent, or Firm*—John W. Whisler

[57] ABSTRACT

An electrically conductive side-by-side biconstituent melt spun fiber is provided having a conductive constituent and a nonconductive constituent. Both constituents comprise a relatively nonconductive polymer. The conductive constituent additionally contains an electrically-conductive material, such as carbon black and wraps around the nonconductive constituent.

7 Claims, No Drawings

MELT SPUN SIDE-BY-SIDE BICONSTITUENT CONDUCTIVE FIBER

BACKGROUND OF THE INVENTION

1. Field of the Invention

This invention relates to an electrically conductive side-by-side biconstituent fiber consisting essentially of relatively nonconductive synthetic thermoplastic fiber-forming polymer and electrically conductive material, such as carbon black.

2. Description of the Prior Art

The annoying effects caused by the buildup of static electricity on the surface of fabrics constructed from nonconductive fibers such as polyamide fibers is generally known. Several approaches have been taken in the past by the textile industry to significantly reduce such effects. One approach which has been quite successful in this regard is to intermingle electrically conductive carbon black-containing fibers with the nonconductive fibers in such fabrics. The carbon black serves to dissipate the static electricity which would otherwise build up on the fabric surface. Several techniques have been used to incorporate carbon black into nonconductive fibers.

One technique, described in U.S. Pat. No. 3,803,453, consists of preparing a sheath-core filament in which carbon black is dispersed in the core component. This technique, however, has not been entirely effective in reducing the static electricity below the 3500 volt level of normal human sensitivity.

Another technique, described in U.S. Pat. No. 3,823,035, consists of penetrating the surface of drawn fiber with carbon black. The penetration is accomplished by applying to the drawn fiber a dispersion consisting of carbon black in a liquid which is a solvent for the fiber. The liquid is removed from the fiber after the desired degree of penetration is obtained but before structural integrity of the fiber is destroyed. The application of the dispersion and subsequent removal of the liquid from the fiber requires extra processing steps, is time consuming and involves the handling of hazardous materials. Since the fibers are drawn prior to applying the dispersion, the resulting fibers cannot be easily combined or blended with nonconductive staple fibers by conventional methods. Also, during normal usage of the fibers, the carbon black tends to flake from the fibers.

Yet another approach for incorporating electrically-conductive carbon black into fibers is described in U.S. Pat. No. 3,969,559. This approach consists of providing a side-by-side biconstituent fiber composed of a nonconductive constituent (e.g. polyamide) which wraps around (i.e. partially encapsulates) a conductive constituent. The conductive constituent constitutes from 1 to 30% by volume of the fiber and is composed of a nonconductive polymer (e.g. polyamide) containing electrically-conductive carbon black dispersed therein. The carbon black is present in the conductive constituent in an amount sufficient to provide a fiber having an electrical resistance of less than $1 \times 10^{10}$ ohms per centimeter at a direct current potential of 0.1 volt when measured at 20% relative humidity and 21° C. The conductive constituent extends longitudinally along the surface of the fiber and inwardly from the surface such that its width is less than the length of the interface of the two constituents. The interface is convex (conductive constituent)/concave (nonconductive constituent). Textile articles containing only a small amount of these fibers are rendered static resistant and retain such property even after prolonged use.

Unfortunately, from the standpoint of commercial operations, considerable process control must be exercised in order to provide a fiber having the configuration of the constituents described in U.S. Pat. No. 3,969,559. In general, this configuration is achieved by maintaining proper control of the melt viscosity of each constituent during melt spinning which severely limits the raw material specifications and permissible spinning conditions. For example, the starting materials (each constituent in flake form) must be extremely dry. If the moisture level of the conductive constituent is greater than about 0.05%, the configuration of constituents is no longer obtainable. To provide and control the moisture level of the constituents at 0.05% or less is troublesome and requires expensive equipment. Also, each constituent must be maintained at a different temperature during the spinning operation so as to keep each constituent at the proper melt viscosity. As a result, expensive and complex twin spinning blocks with twin heating medium supplies and twin transfer lines, each having separate temperature and pressure controls, are required. It has also been found that conventional additives (e.g. stabilizers and extenders) cannot be incorporated into the conductive constituent without adversely affecting the melt viscosity of the conductive constituent.

An object of the invention is to provide a conductive fiber which is easier and less costly to produce than the fiber described in U.S. Pat. No. 3,969,559.

Another object of the present invention is to provide a conductive fiber having an electrical resistance equal to or less than that of the fiber described in U.S. Pat. No. 3,969,559.

SUMMARY OF THE INVENTION

The present invention provides a side-by-side melt spun fiber having a conductive constituent and a nonconductive constituent. The conductive constituent consists essentially of normally nonconductive polymer containing uniformly dispersed therein an electrically-conductive material in particulate form in an amount sufficient to provide the fiber with an electrical resistance of less than about $1 \times 10^{10}$ ohms per centimeter at a direct current potential of 0.1 volt when measured at 20% relative humidity and 21° C. The nonconductive constituent consists essentially of normally nonconductive polymer. The cross-section of the fiber is characterized in that the conductive constituent extends along a portion or length (L) of the periphery of the fiber and inwardly therefrom a distance (D) whereby the ratio of L to D is in the range of from 4:1 to 100:1. The interface formed by the constituents is convex (nonconductive constituent)/concave (conductive constituent). The cross-sectional area of the conductive constituent constitutes less than about 20% of the cross-sectional area of the fiber. The conductive constituent is present in the fiber as a continuous stripe extending longitudinally along the surface of the fiber and wraps around a portion of the fiber. The width of the stripe may vary from about 10% to about 80% of the periphery of the fiber.

The fiber of the present invention may be conveniently prepared by utilizing a biconstituent melt spinning apparatus and the polymer compositions described in U.S. Pat. No. 3,969,559. However, in spinning the fiber of the present invention a great deal less process control is required than in the spinning of the fiber described in U.S. Pat. No. 3,969,559. For example, in spinning the fiber of the present invention the constituents may be processed at the same temperature, thereby using only one set of controls and less drying of the starting materials, particularly the conductive constituent flake, is required. As a result, the fiber of the present invention is easier and less costly to prepare than the fiber described in U.S. Pat. No. 3,696,559. Also, additives may be incorporated into the conductive constituent of the fiber of the present invention, thereby offering advantages in fiber properties. In preparing the subject fiber the melt viscosity of the conductive constituent must be less than that of the non-conductive constituent during extrusion so that the desired wraparound configuration is obtained.

The fiber of the present invention is exactly opposite in concept from the fiber described in U.S. Pat. No. 3,969,559; the conductive constituent of the subject fiber wraps around the nonconductive constituent, whereas the nonconductive constituent of the fiber described in U.S. Pat. No. 3,969,559 wraps around the conductive constituent.

Surprisingly, even though the conductive constituent of the fiber comprises a narrow wraparound band at the surface of the fiber, the fiber remains intact during processing and normal usage thereof, that is, the conductive constituent does not split, flake or otherwise separate from the nonconductive constituent.

The conductive fiber of the present invention may be used alone or combined or intermingled with other fibers, in the making of textile articles such as carpets, blankets, upholstery, draperies, and the like, thereby eliminating or significantly reducing the annoying effects of static electricity that otherwise build up on the surface of such articles. The fiber may be used in the form of a continuous filament or staple. When used in the form of a staple, the fiber is advantageously blended with nonconductive staple fiber, such as polyester or nylon staple, to obtain a static resistant spun staple fiber.

DESCRIPTION OF THE PREFERRED EMBODIMENTS

In describing the fiber of the present invention reference is made to the disclosure of U.S. Pat. No. 3,969,559. Accordingly, the disclosure of U.S. Pat. No. 3,969,559 is incorporated herein by reference.

The fiber of the present invention may be made from any of the fiber-forming polymer compositions described in U.S. Pat. No. 3,969,559 using a side-by-side biconstituent filament melt spinning apparatus such as an apparatus of the general type described in said patent. Examples of commercially available polymers which may be used include nylon 66, nylon 6, nylon copolymers such as 66/6TA (i.e. hexamethylene adipamide/hexamethylene terephthalamide copolymers) wherein the 6TA comprises from 5 to 40 mole % of the copolymer, polyesters (e.g. polyethylene terephthalate) and polyurethanes. The polymers may be modified by the use of materials such as dye modifiers, delusterants, stabilizers and the like. For better adherence of the constituents of the fiber, it is preferred that the polymers of both constituents be of the same class, for example, both polyamides or both polyesters. Particularly preferred polymers from the standpoint of commercial operations are nylon 66, nylon 6 and polyethylene terephthalate.

The electrically-conductive material useful in preparing the fiber of this invention is preferably carbon black having a specific or volume resistivity of less than 200 and preferably less than 100 ohms-cm as measured by ASTM Method D991-68. While other conductive materials such as powdered metals may be used, these materials are more costly and therefore less desirable. The amount of conductive material dispersed in the polymer of the conductive constituent should be only that amount sufficient to render the fiber conductive. By "conductive" or "electrically-conductive" fiber is meant a fiber having an electrical resistance of less than $1 \times 10^{10}$ ohm/cm at a direct current potential of 0.1 volt when measured at 20% relative humidity and 20° C. The conductive material may be dispersed in the polymer of the conductive constituent by known mixing procedures. In the case of carbon black, the best level of conductivity is achieved without substantial sacrifice of processing when the conductive constituent contains between 25 and 50% by weight of carbon black.

The biconstituent fiber is preferably round in cross-section, although other cross-sections, such as multilobal, may be employed. The fiber is characterized in that the cross-sectional area of the conductive constituent constitutes less than about 20% of the cross-sectional area of the fiber.

In melt spinning the fiber of the present invention spinning conditions are utilized which insure that the melt viscosity of the conductive constituent is sufficiently less than that of the nonconductive constituent during extrusion. Under such conditions the conductive constituent of the extruded fiber wraps around the nonconductive constituent and has an L to D ratio of at least 4 to 1 and preferably 5:1 to 50:1 or higher. The greater the difference between the melt viscosities of the constituents, the greater the wraparound effect and the greater the L to D ratio. The desired difference in the melt viscosities of the two constituents can be easily attained, for example: by adding a small amount of plasticizer to the conductive constituent; by maintaining both constituents at a high temperature (preferably the same temperature) and/or by reducing the temperature of the nonconductive constituent. In general, for good spinning performance the melt viscosity of the nonconductive constituent, the major constituent, should be at least about 1000 poise at a shear rate of 20 sec$^{-1}$ and 285° C.

A convenient means for achieving the desired difference between the melt viscosities of the two constituents is to dry the conductive constituent to a lesser degree than the nonconductive constituent. For example, instead of drying both constituents to a moisture content of 0.05% by weight or less, the conductive constituent is dried only to a moisture content of, for example 0.1 – 0.3% by weight. The water present in the conductive constituent acts as a plasticizer and reduces its melt viscosity. While water is a preferred plasticizer for obvious reasons, other conventional plasticizers may be used instead by adding up to 5% by weight of such a plasticizer to the conductive constituent after the constituent has been dried.

EXAMPLE 1

This example illustrates the preparation of fiber of the present invention using nylon 66 polymer to form the nonconductive constituent and nylon 6 polymer containing uniformly dispersed therein 31% by weight of conductive carbon black to form the conductive constituent. The carbon black had the following reported analysis:

| Fixed carbon | 98.5% |
|---|---|
| Volatiles | 1.5% |
| Particle size | 23 millimicrons |
| Surface area | 125 m²/g |
| Electrical resistivity | very low |

Using the side-by-side biconstituent fiber melt spinning apparatus described and illustrated in U.S. Pat. No. 3,969,559 the nylon 66 polymer (containing about 0.05% by weight moistuure) in the form of chips of cube-like shape was fed to a 1½ inch screw melter and the carbon black-containing nylon 6 polymer (containing 0.110% by weight moisture) in the form of cylinders measuring about 3 mm in diameter and about 3–6 mm in length was fed to the other 1½ inch screw melter. Each polymer was delivered via a separate metering pump to the spinneret where the polymers converge in single laminal streams in the lower portion of each capillary of the spinneret. The following conditions were employed:

| | Nylon 66 | C.B.-Contg Nylon 6 |
|---|---|---|
| % by Volume | 94 | 6 |
| Melt Temp., °C. | 300 | 260 |
| Moisture, % by Wt. | 0.05 | 0.110 |
| Spinneret Temp. °C. | 275° C. | |

The extruded biconstituent fiber was spun in a conventional melt spinning chimney having a cross flow of cooling air with a delivery temperature of 18° C. A known finish was applied to the fiber and the fiber was collected at a speed of 411.48 m/min. The fiber was then withdrawn overend from a package and forwarded to a pair of feed rolls that delivered the fiber at a speed of 216 m/min to a hot roll (225° C.) driven at a periphery speed of 217 m/min. Between the feed roll and hot roll the fiber made one wrap around a draw pin (6.4 mm diameter) at ambient temperature. From the hot roll the fiber was forwarded to a cold draw roll driven at a periphery speed of 751 m/min. The fiber made five wraps around the draw roll and its associated separator roll. The fiber was then collected using a conventional ring-traveler take-up device.

The resulting drawn fiber had the following physical properties:

| Denier | 24.5 |
|---|---|
| Tenacity | 2.7 gpd |
| Elongation | 71.7% |
| Electrical Resistance | 3.87 × 10⁶ ohmns/cm |

Photomicrographs were made of the cross-section of the fiber. From the photomicrographs it was determined that the conductive constituent extended along 29.17% of the periphery of the fiber and inwardly a depth equivalent to 7.69% of the diameter of the fiber. The L:D ratio of the conductive constituent was calculated to be 11.9 to 1 using the formula:

$$\frac{L}{D} = \frac{0.2917 \times \text{diam.} \times \pi}{0.0769 \times \text{diam.}} = 11.9168.$$

In the second run a fiber was prepared using the same procedure and conditions as described above except that the spinning speed was 822.96 m/min instead of 411.48 m/min. In this instance the drawn fiber had the following physical properties:

| Denier | 24.7 |
|---|---|
| Tenacity | 3.27 gpd |
| Elongation | 66.5% |
| Electrical Resistance | 1.89 × 10⁶ ohms/cm |
| L to D Ratio | 7.855 |

For purposes of comparison another run (run 3) was made by which a fiber was prepared using the same procedure and conditions as in the first run except that the nylon 6 contained 39% instead of 31% by weight carbon black and the carbon black-containing nylon 6 polymer was dried to a moisture content of 0.046% instead of 0.110%. In this instance the fiber has the following physical properties:

| Denier | 24.7 |
|---|---|
| Tenacity | 2.2 gpd |
| Elongation | 50.82% |
| Electrical Resistance | 2.01 × 10⁶ ohms/cm |
| L to D Ratio | 0.393 to 1 |

The fiber made in run 3 was made in accordance with U.S. Pat. No. 3,969,559. As can be seen from the L to D ratio of the fiber of run 3, the non-conductive constituent had a lower melt viscosity than the conductive constituent and, therefore, encapsulated or wrapped around the conductive constituent. In contrast, in runs 1 and 2 the conductive polymer, being of a lower melt viscosity than the nonconductive polymer, wrapped around the more viscous nonconductive polymer.

EXAMPLE 2

This example illustrates the preparation of fiber of the present invention wherein the desired L to D ratio of the conductive constituent is obtained by increasing the melt temperature of the conductive polymer and thereby reducing its melt viscosity.

The fiber was prepared by the procedure described in Run 1 of Example 1 except that in this instance the nylon 6 contained 39% by weight of the carbon black and 0.086% by weight water, and the nylon 66 contained 0.023% by weight water. The temperatures of the nylon 6 and nylon 66 polymer melts delivered from the screw melters were 270° C. and 294° C., respectively.

The melts were spun to fiber in the same manner as described in Example 1. The as-spun fiber had a denier of 74.5, an electrical resistance of 4.59 × 10⁶ ohms/cm, and a L to D ratio of about 9.

The desired wraparound effect was attained in this example by merely running the melt spinning apparatus at high temperatures. In contrast, in another run made under similar conditions except that the nylon 6 polymer melt temperature was 248° C. instead of 270° C., the conductive constituent of the resulting fiber had an L to D ratio of only about 0.4 to 1 and an electrical resistance of 3.43 × 10⁶ ohms/cm.

I claim:

1. A side-by-side biconstituent melt spun fiber having a conductive constituent and a nonconductive constituent, wherein said conductive constituent consists essentially of normally nonconductive polymer containing uniformly dispersed therein an electrically conductive material in particulate form in an amount sufficient to provide said fiber with an electrical resistance of less than about $1 \times 10^{10}$ ohms per centimeter at a direct current potential of 0.1 volt when measured at 20% relative humidity and 21° C. and said nonconductive constituent consists essentially of normally nonconductive polymer, the cross-section of said fiber being characterized in that the conductive constituent extends along a portion (L) of the periphery of the fiber and inwardly therefrom a distance (D) whereby the ratio of L to D is in the range of 4:1 to 100:1, wherein the interface formed by said nonconductive constituent/conductive constituent is convex/concave and the cross-sectional area of said conductive constituent comprises less than about 20% of the cross-sectional area of said fiber.

2. The fiber of claim 1 wherein the (L) to (D) ratio is between 5:1 and 50:1.

3. The fiber of claim 1 wherein said electrically conductive material is carbon black.

4. The fiber of claim 3 wherein said normally nonconductive polymer of said conductive constituent is a polyamide and said normally nonconductive polymer of said nonconductive constituent is also a polyamide.

5. The fiber of claim 4 wherein the polyamide is polyhexamethylene adipamide.

6. The fiber of claim 4 wherein the polyamide of the conductive constituent is polycaprolactam and the polyamide of the nonconductive constituent is polyhexamethylene adipamide.

7. The fiber of claim 3 wherein between 10% and 80% of the surface of said fiber is composed of said conductive constituent.